(12) United States Patent
Goldin

(10) Patent No.: US 6,185,299 B1
(45) Date of Patent: Feb. 6, 2001

(54) ADAPTIVE ECHO CANCELLATION DEVICE IN A VOICE COMMUNICATION SYSTEM

(75) Inventor: Alexander Goldin, Haifa (IL)

(73) Assignee: International Business Machines Corporation, Armonk, NY (US)

( * ) Notice: Under 35 U.S.C. 154(b), the term of this patent shall be extended for 0 days.

(21) Appl. No.: 09/102,482

(22) Filed: Jun. 22, 1998

(30) Foreign Application Priority Data

Oct. 31, 1997 (EP) .................................................. 97480074

(51) Int. Cl.[7] .............................. H04M 9/00; H04M 9/08
(52) U.S. Cl. ........................................... 379/406; 379/410
(58) Field of Search ..................................... 379/406, 410, 379/407, 408, 411, 409

(56) References Cited

U.S. PATENT DOCUMENTS

| | | | |
|---|---|---|---|
| 4,591,669 | * 5/1986 | Duttweiler et al. | 379/410 |
| 5,305,307 | * 4/1994 | Chu | 370/32.1 |
| 5,577,116 | * 11/1996 | Towsend et al. | 379/410 |
| 5,694,474 | * 12/1997 | Ngo et al. | 381/66 |
| 6,002,776 | * 12/1999 | Bhadkamkar et al. | 381/66 |

* cited by examiner

Primary Examiner—Richmond Dorvil
(74) Attorney, Agent, or Firm—John D. Flynn

(57) ABSTRACT

A method and device for adaptive echo cancellation in a voice communication system wherein a reference signal x is sent over the system from a transmitting device and comprising an adaptive filter for removing any echo signal from a primary signal d received in answer to reference signal x, and said adaptive filter having a plurality of coefficients the value of which at each time n being computed from the value of the same coefficient at time n−1 modified by a normalization factor depending upon the energy of said reference signal and provided by a normalization factor controlling unit. The normalization factor is the maximum value between a first value representing the energy of reference signal x at time n and a second value depending on a value of the normalization factor previously stored during a preceding predetermined interval time multiplied by an attenuation factor less than 1.

12 Claims, 3 Drawing Sheets

ADAPTIVE ECHO CANCELLATION DEVICE IN A VOICE COMMUNICATION SYSTEM

FIELD OF THE INVENTION

The invention relates to the echo cancellation in voice communication systems and more particularly to an improved adaptive echo cancellation device especially useful in case of double-talk.

BACKGROUND OF THE INVENTION

Echo cancellation plays a fundamental role in modern telephony. The quality of telephone communications and the performance of the modern networks depend to a large extent upon the ability of the equipment to avoid or cancel echoes.

There are two kinds of echoes which may arise in the telephony: electrical echoes and acoustical echoes. The electrical echoes are due to impedance mismatch at the devices called hybrids where two-wire lines become four-wire lines. Hybrids are traditionally used when the two-wire local subscriber loop becomes a four-wire long distance trunk. The hybrid is also used at the point where the four wires (two wires from the microphone, and two wires from the speaker) are converted into the two-wire local loop.

The acoustic echo arises in a case when there is an acoustic path between the loudspeaker and the microphone so that part of the signal reproduced by the loudspeaker is reflected (weakened, delayed and distorted) by the room and then recorded by the microphone which is the typical situation when using a speakerphone.

Adaptive filters are used to cancel, or at least, significantly weaken the echoes for improving the quality and performance of telephone connections. Assuming that the input signal x (called reference signal) enters the echo generation system (hybrid or room); it generates an echo signal y which is mixed with the signal s which comes from the other side of the connection. The purpose of the adaptive filter is to subtract echo signal y from the output signal y+s (called primary signal). The signal remaining after the echo subtraction is the signal s plus an error r which is to be minimized. The adaptive filter bases its estimation of echo cancellation quality on the signal which results after the subtraction of the estimated echo from the echo generation system output. But in case of double-talk situation and even in a case of perfect echo cancellation, the output signal will not be equal to zero. Since the adaptive filter itself has no means to distinguish between the error r and the signal s, it will try to cancel the signal s leading to a wrong estimation of the echo path with following distortion of the signal of interest. To avoid this problem, a special block called double-talk detector is generally used. The purpose of this block is to detect the presence of the signal s and to give the adaptive filter a signal inhibiting its adaptation. In practice, some amount of the signal s is always present due to the environmental noise thus making a reliable double-talk detector very difficult to implement. Besides, if the echo path is changing during the double-talk, the system will not be able to track these changes making the results of echo cancellation totally irrelevant.

Various algorithms of adaptive filtering can be used in the echo cancellation system. The algorithm using Normalized Least Mean Squares (NLMS) is the most widely used for echo canceling application. This algorithm is very simple and easy to implement on a digital signal processor, but it suffers from the double-talk situation described above.

SUMMARY OF THE INVENTION

Accordingly, the main object of the invention is to provide a method and a device for adaptive echo cancellation overcoming the double-talk problem without using a double-talk detector.

Another object of the invention is to provide a method and a device for adaptive echo cancellation wherein the adaptation of the adaptive filter coefficients is not affected by the double-talk situation.

The invention relates therefore to a method for adaptive echo cancellation in a voice communication system wherein a reference signal x is sent over the system from a transmitting device and comprising an adaptive filter for removing any echo signal from a primary signal d received by the transmitting device, the echo signal being sent back by the communication system in answer to reference signal x, and the adaptive filter having a plurality of coefficients the value of which at each time n being computed from the value of the same coefficient at time n−1 modified by a normalization factor depending upon the energy of the reference signal. The normalization factor is the maximum value between a first value representing the energy of reference signal at time n and a second value depending on a value of the normalization factor previously stored during a preceding predetermined interval time multiplied by an attenuation factor less than 1.

According to another aspect, the invention relates to a device for adaptive echo cancellation in a voice communication system wherein a transmitting device sends a reference signal x over the voice communication system and receives a primary signal d from the voice communication system, such a device comprising an adaptive filter for removing any echo signal sent back by the voice communication system in answer to the reference signal and a normalization factor controlling unit for determining the value at time n of each coefficient of the adaptive filter based upon the value of the same coefficient of the reference signal. The normalization factor controlling unit comprises means for selecting the normalization factor as being the maximum value between a first value representing the energy of the reference signal at time n and a second value depending on a value of the normalization factor previously stored during a preceding predetermined interval time multiplied by an attenuation factor.

BRIEF DESCRIPTION OF THE DRAWINGS

These and other objects, features and advantages of the present invention will become apparent upon a consideration of the following detailed description of the invention when reads in conjunction with the drawings in which.

DETAILED DESCRIPTION OF THE INVENTION

Figure 1:
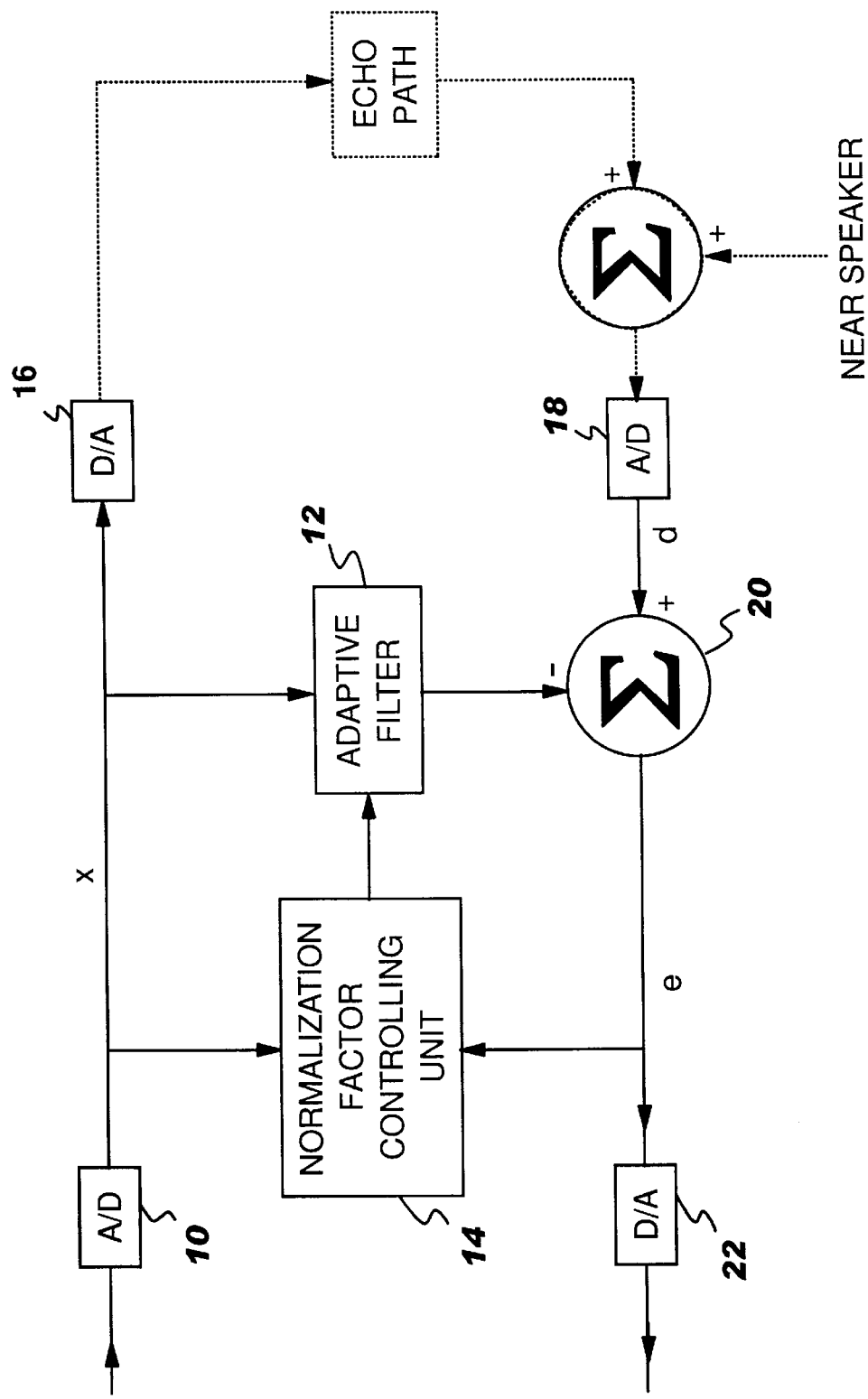
FIG. 1 is schematic block diagram of an adaptive cancellation device incorporating the invention.

An adaptive echo cancellation device used in a voice communication system is shown in FIG. 1. The analog audio signal is input to analog-to-digital converter 10 so that a digital signal x (reference signal) is fed to adaptive filter 12 the coefficients of which are adapted according to the standard NLMS (Normalized Least Mean Squares) algorithm. These coefficients are provided by a normalization factor controlling unit 14 which is implemented according the principles of the invention as described hereafter.

Reference signal x is also supplied to digital-to-analog converter 16 providing an analog signal which is sent to the remote side of the communication system. But, due to a hybrid (echo path) and/or the near speaker, an echo signal y is sent back to the near side of the system as represented by dashed lines.

After being converted into digital form by analog-to-digital converter 18, the echo signal is mixed with the signal from the remote side to provide a primary signal d. Then, the estimated echo signal provided by adaptive filter 12 is subtracted from primary signal d in subtractor 20 to provide signal e which is used to adapt the adaptive filter coefficients. It must be noted that primary signal d is either a pure echo and therefore signal e is only an error signal, or principally the signal from the remote side in case of double-talk. In any case, signal e is converted into analog form by digital-to-analog converter 22 before being transmitted to the near speaker.

Figure 2:
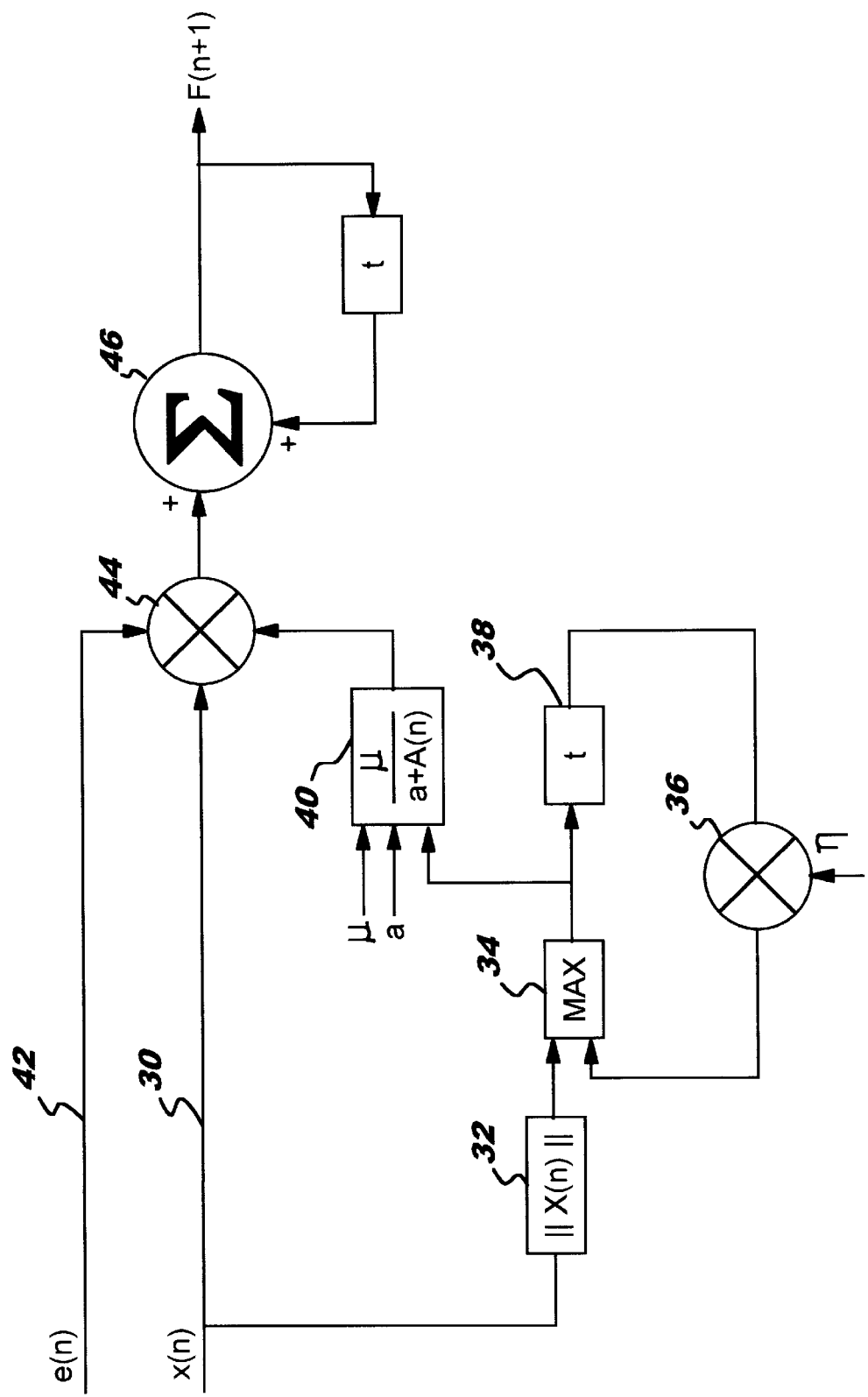
FIG. 2 is a schematic block diagram of a normalization factor controlling unit according to an embodiment of the invention.

The normalization factor controlling unit 14 a block diagram of which is given in FIG. 2 provides the coefficients F(n) of the adaptive filter at each time n. The adaptive filter is represented as an L vector of filter taps and the filtering operation on the reference signal is performed as the convolution sum.

Assuming that:

L is the number of filter taps, $\mu$ is an adaptation speed factor, a is a small positive stabilization constant, $\eta$ is an attenuation factor less than 1, and $X(n) = [x(n), x(n-1), \ldots, x(n-L+1)]$ i.e. the last L samples of the reference signal, d(n)=the last tap of the primary signal $F(n) = [f_0(n), \ldots, f_{L-1}(n)]$, i.e. the vector of L filter taps at time n

F(0)=0

The output of the adaptive filter e(n) has the following value with respect to primary signal d(n):

$$e(n) = d(n) - F(n) \cdot X(n)$$

with the value of F(n) is computed in the following way:

$$F(n+1) = F(n) + \frac{\mu}{a + A(n)} \cdot X(n) \cdot e(n)$$

in which $$A(n) = \max\left[\eta \cdot A(n-1), \|X(n)\|^2\right]$$

The value of coefficients F(n) can be easily computed by a processor. However, it is possible to implement specific hardware device as represented by the block diagram of FIG. 2.

First, the value X(n) input on line 30 are supplied to LMS circuit 32 which computes the sum of least mean squares $\|X(n)\|^2$. Then, a comparator circuit 34 provides the maximum between $\|X(n)\|^2$ and the previous value A(n-1) multiplied by the energy forgetting factor in multiplier 36. Note that A(n-1) is provided by the output value of comparator circuit 34 which has been delayed by t (time interval between moments n and n-1) in delay circuit 38.

Then, the maximum between $\|X(n)\|^2$ and $\eta \cdot A(n-1)$ is input to computing circuit 40 which provides the ratio $$\frac{\mu}{a + A(n)}$$

using adaptation speed factor $\mu$ and stabilization constant a. Note that a is a small constant which is necessary to prevent division by zero when the reference signal is zero. Practically, this situation never happens since the reference signal always contains some noise.

The ratio $$\frac{\mu}{a + A(n)}$$

the values X(n) on line 30, e(n) on line 42, are then multiplied together in multiplier 44. The output of multiplier 44 is provided to summing circuit 46 together with coefficient F(n) for each filter tap. Note that F(n) is the previous value of the same coefficient which has been delayed by t in delay circuit 48. The output of summing circuit 46 gives the coefficient value F(n+1) for each filter tap.

The implementation of the invention enables to solve the problem of double-talk without using a double-talk detector (DTD) for inhibiting the adaptation of the adaptive filter. Indeed, in case of double-talk (or when the primary signal contains noise), there is a problem if the energy of the reference signal x falls to a small value suddenly (transition regions). With a normalization factor always equal to $\|X(n)\|^2$ the risk is that F(n) takes larger and larger values based upon a smaller and smaller normalization factor. Besides, in such a case, the error e(n) is high (due to the presence of the extra signal) and, as a result, the algorithm makes large but unjustified updates of the filter coefficients.

With the invention, normalization factor A(n) keeps its previous value and the algorithm will behave in accordance with the previously encountered highest energy. However, to avoid that the normalization factor takes larger and larger values, the previous value is multiplied by a factor $\eta$ less than 1. Such a factor is called an energy forgetting factor is in fact an attenuation factor insofar as it is used also to prevent a situation when a sudden burst of the reference signal energy will influence the behavior of the filter algorithm for an infinite time. It has been found that the value of this factor such that the algorithm forgets about half the burst energy in a second works very well in echo cancellation applications. Accordingly, for the sampling rate of 8 KHz, a good value of this factor can be 0.9999. This value could be different for different applications and/or could be dynamically altered based upon the filter behavior.

Figure 3:
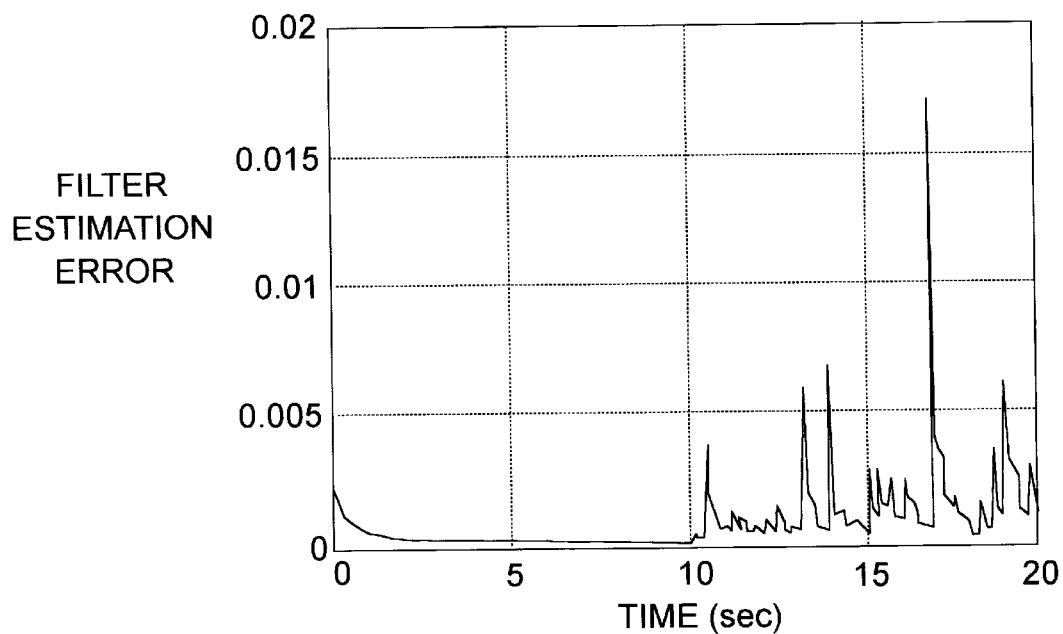
FIG. 3 shows a time diagram representing the filter estimation error when a standard adaptive filter is used.

FIG. 3 shows a time diagram representing the filter estimation error when a standard adaptive filter is used. During the first 10 seconds, there is no double-talk and the curve is decreasing to 0 after some time corresponding to the time necessary for the adaptation of the filter. During the last 10 seconds, a double-talk has been simulated. As illustrated, the filter error does not decrease to 0, but becomes significant with very important peaks.

Figure 4:
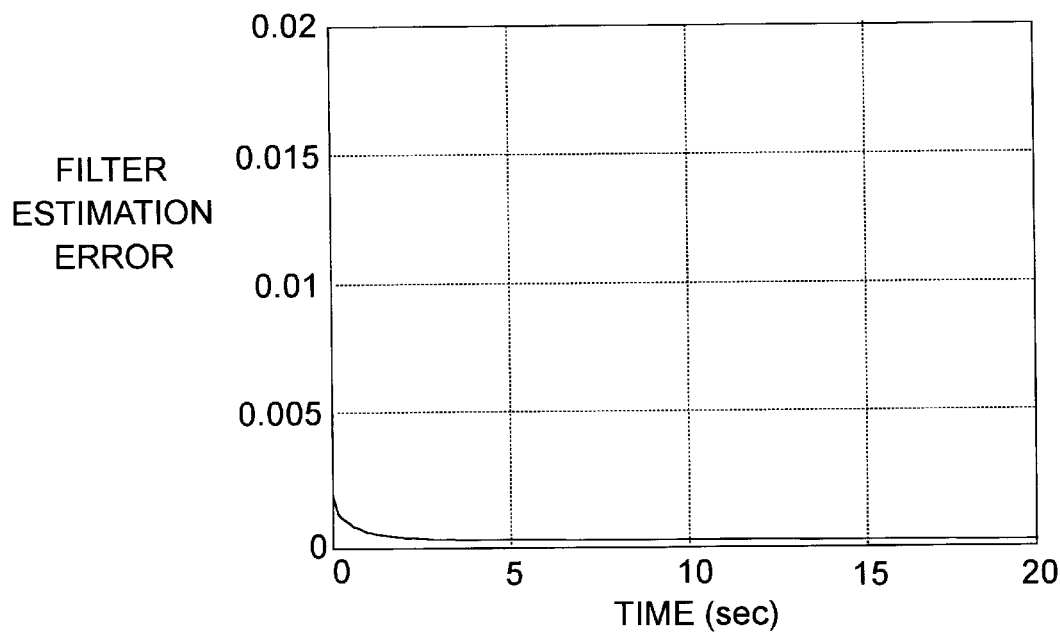
FIG. 4 shows a time diagram representing the filter estimation error when a filter implementing the invention is used.

FIG. 4 shows a time diagram representing the filter estimation error with a filter implementing the invention. The conditions are the same as for FIG. 3, that is a double-talk has been simulated during the last 10 seconds over a total time of 20 seconds. Comparing the results, it is seen that the curve keeps on decreasing to 0 during the last 10 seconds even though the primary signal is affected by double-talk.

While there has been described and illustrated a preferred embodiment of an adaptive echo cancellation device, it will be apparent to those skilled in the art that modifications and variations are possible without deviating from the scope of the invention. Thus, it would be possible to trigger the system in order to use the invention only when the energy of the reference signal becomes less than a predetermined level. Another possible variation would be to use for the normalization factor the value corresponding to the maximum energy detected during a predetermined time interval rather than taking always the previous value A(n−1).

What is claimed:

1. A method for adaptive echo cancellation in a voice communication system comprising the steps of:
   transmitting a reference signal x over the system from a transmitting device;
   removing any echo signal from a primary signal d received by said transmitting device, said echo signal being sent back by said voice communication system in answer to said reference signal x, using an adaptive filter having a plurality of coefficients the value of which at each time n being computed from the value of the same coefficient at time n−1 modified by a normalization factor depending upon the energy of said reference signal d in that said normalization factor is the maximum value between a first value representing the energy of said reference signal at time n and a second value depending on a value of said normalization factor previously stored during a preceding predetermined interval time multiplied by an attenuation factor less than 1.

2. The method according to claim 1, wherein the values of the adaptive filter coefficients are given by the formulae $$F(n+1) = F(n) + \frac{\mu}{a + A(n)} \cdot X(n) \cdot e(n)$$

and said normalization factor has the following value: $A(n)=\max[\eta \cdot \text{Amax}, \|X(n)\|^2]$ in which $\mu$ is an adaptation speed factor, a is a small positive stabilization constant, $\eta$ is an attenuation factor less than 1, Amax is the maximum value of said normalization factor stored during a previous predetermined interval time, $X(n)=[x(n), x(n-1), \ldots, x(n-L+1)]$ with L being the number of filter taps in the adaptive filter, and $e(n)=d(n)-F(n) \cdot X(n)$ where d(n) is the value of primary signal at time n.

3. The method according to claim 2, wherein the value of Amax is the value A(n−1) of said normalization factor at time n−1.

4. The method according to claim 1, 2 or 3, wherein $\eta$ is approximately=0.9999.

5. A device for adaptive echo cancellation in a voice communication system comprising:
   a circuit for transmitting a reference signal x over said communication system and receiving a primary signal d from said voice communication system, the primary signal including an echo signal from the voice communication system in response to the transmission of the reference signal x;
   an adaptive filter for removing any echo signal sent back by said voice communication system in answer to said reference signal and a normalization factor controlling unit for determining the value at time n of each coefficient of said adaptive filter based upon the value of the same coefficient at time n−1 modified by a normalization factor A(n) depending on the energy of said reference signal;
   the normalization factor controlling unit having a means for selecting said normalization factor as being the maximum value between a first value representing the energy of said reference signal at time n and a second value depending on a value of said normalization factor previously stored during a preceding predetermined interval time multiplied by an attenuation factor.

6. The device according to claim 5, wherein said normalization factor controlling unit further comprises:
   a first means for determining the maximum between $\|X(n)\|^2$ and $\eta \cdot \text{Amax}$ wherein $X(n)=[x(n),x(n-1), \ldots, x(n-L+1)]$ with L being the number of filter taps in the adaptive filter, $\eta$ is an attenuation factor less than 1, Amax is the maximum value of said normalization factor stored during a previous predetermined interval time, and
   second means for determining $$\frac{\mu}{a + A(n)}$$

where a is a small positive stabilization constant, $\mu$ is an adaptation speed factor, and A(n) is said normalization factor at time n;
   a multiplier to determine a $$\frac{\mu}{a + A(n)} \cdot X(n) \cdot e(n)$$

wherein $e(n)=d(n)-F(n) \cdot X(n)$ with d(n) being the value of said primary signal at time n and F(n) are the values of the adaptive filter coefficients;
   a summing circuit for determining the values of said adaptive filter coefficients in accordance with the formulae $$F(n+1) = F(n) + \frac{\mu}{a + A(n)} \cdot X(n) \cdot e(n).$$

7. The device according to claim 6, wherein the value of Amax is the value A(n−1) of said normalization factor at time n−1.

8. The device according to claim 6, wherein $\eta$ is approximately 0.9999.

9. A method for adaptive echo cancellation in a communication system comprising the steps of:
   transmitting a reference signal x to the system;
   receiving a primary signal d from the system, the primary signal including an echo signal from the communication system in response to the transmission of the reference signal x;
   removing the echo signal from the primary signal d using an adaptive filter having a plurality of coefficients the value of which at each time n being computed from the value of the same coefficient at time n−1 modified by a normalization factor depending upon the energy of said reference signal d in that said normalization factor is the maximum value between a first value representing the energy of said reference signal at time n and a second value depending on a value of said normalization factor previously stored during a preceding predetermined interval time multiplied by an attenuation factor less than 1.

10. The method according to claim 9, wherein the values of the adaptive filter coefficients are determined by $$F(n+1) = F(n) + \frac{\mu}{a + A(n)} \cdot X(n) \cdot e(n)$$

and said normalization factor is

A(n)=max[η·Amax, ‖X(n)‖²] in which $\mu$ is an adaptation speed factor, a is a small positive stabilization constant, η is an attenuation factor less than 1, Amax is the maximum value of said normalization factor stored during a previous predetermined interval time, X(n)=[x(n), x(n−1), . . . ,x(n−L+1)] with L being the number of filter taps in the adaptive filter, and e(n)=d(n)−F(n)·(n) where d(n) is the value of primary signal at time n.

11. The method according to claim 10, wherein the value of Amax is the value A(n−1) of said normalization factor at time n−1.

12. The method according to claim 9, 10, or 11, wherein η is approximately=0.9999.

* * * * *